United States Patent
Goyal

(10) Patent No.: US 11,210,317 B2
(45) Date of Patent: Dec. 28, 2021

(54) SYSTEM AND METHOD FOR HIGH-AVAILABILITY IN A DISTRIBUTED COMPUTING ENVIRONMENT INCLUDING MULTIPLE AVAILABILITY ZONES

(71) Applicant: Walmart Apollo, LLC, Bentonville, AR (US)

(72) Inventor: Sachin Goyal, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 269 days.

(21) Appl. No.: 16/249,853

(22) Filed: Jan. 16, 2019

(65) Prior Publication Data

US 2020/0226146 A1    Jul. 16, 2020

(51) Int. Cl.
  *G06F 16/00*    (2019.01)
  *G06F 16/27*    (2019.01)
  *G06F 16/22*    (2019.01)
  *G06F 16/28*    (2019.01)

(52) U.S. Cl.
  CPC .......... *G06F 16/27* (2019.01); *G06F 16/2246* (2019.01); *G06F 16/282* (2019.01)

(58) Field of Classification Search
  CPC ..... G06F 16/27; G06F 16/2246; G06F 16/282
  See application file for complete search history.

(56) References Cited

U.S. PATENT DOCUMENTS

| | | | |
|---|---|---|---|
| 8,880,515 B2* | 11/2014 | Lamba | G06F 16/24578 707/723 |
| 2015/0089522 A1* | 3/2015 | Volovich | H04N 21/25891 725/14 |
| 2016/0275081 A1* | 9/2016 | Tian | G06F 16/2246 |
| 2019/0278483 A1* | 9/2019 | Mahmood | G06F 3/067 |

* cited by examiner

*Primary Examiner* — Augustine K. Obisesan
(74) *Attorney, Agent, or Firm* — Duane Morris LLP; Manita Rawat

(57) ABSTRACT

Systems and methods of distributing replicas within a data center are disclosed. A replica distribution scheme for one or more shards is received. The replica distribution scheme indicates a number of replicas of the one or more shards to be distributed within a data center. The data center comprises a plurality of hosts divided into at least a first hierarchical level and a second hierarchical level. A usage score is calculated for a plurality of nodes in the first hierarchical level of the data center and the plurality of nodes is sorted in the first hierarchical level based on the calculated usage score. A set of replicas is distributed to one or more of the plurality of nodes within the first hierarchical level based on the sorting of the plurality of nodes.

20 Claims, 9 Drawing Sheets

SYSTEM AND METHOD FOR HIGH-AVAILABILITY IN A DISTRIBUTED COMPUTING ENVIRONMENT INCLUDING MULTIPLE AVAILABILITY ZONES

TECHNICAL FIELD

This application relates generally to distributed storage systems and, more particularly, to providing high-availability of distributed storage systems.

BACKGROUND

Data centers provide multiple systems or servers configured to provide distributed storage for cloud-based (or remote) systems and services. Traditional data centers are organized into a hierarchical tiered structure configured to allow portions of the data center to operate independent of other portions of the data center. For example, a data center may include multiple fault domains with each fault domain including a plurality of update domains. Other data centers may include single or multiple hierarchy levels referred to as clouds. Each domain or cloud may include a plurality of servers (also called hosts). Each host may include a replica of a shard of a distributed database, service, etc.

In traditional distribution systems, replicas are randomly assigned to servers within a data center. Random assignment of replicas may result in clustering of hosts on a single fault domain, single update domain, and/or single cloud such that failure of any single fault domain, update domain, or cloud results in one or more shards being unavailable. Current systems fail to adequately protect against loss of a shard due to failure of a single zone within the data center.

SUMMARY

In various embodiments, a system including a computing device is disclosed. The computing device is configured to receive a replica distribution scheme for one or more shards. The replica distribution scheme indicates a number of replicas of the one or more shards to be distributed within a data center. The data center comprises a plurality of hosts divided into at least a first hierarchical level and a second hierarchical level. The computing device is further configured to calculate a usage score for a plurality of nodes in the first hierarchical level of the data center and sort the plurality of nodes in the first hierarchical level based on the calculated usage score. The computing device distributes a set of replicas to one or more of the plurality of nodes within the first hierarchical level based on the sorting of the plurality of nodes.

In various embodiments, a non-transitory computer readable medium having instructions stored thereon is disclosed. The instructions, when executed by a processor cause a device to perform operations including receiving a replica distribution scheme for one or more shards. The replica distribution scheme indicates a number of replicas of the one or more shards to be distributed within a data center. The data center comprises a plurality of hosts divided into at least a first hierarchical level and a second hierarchical level. The instructions further cause the device to calculate a usage score for a plurality of nodes in the first hierarchical level of the data center and sort the plurality of nodes in the first hierarchical level based on the calculated usage score. The instructions cause the device to distribute a set of replicas to one or more of the plurality of nodes within the first hierarchical level based on the sorting of the plurality of nodes.

In various embodiments, a method is disclosed. The method includes a step of receiving a replica distribution scheme for one or more shards. The replica distribution scheme indicates a number of replicas of the one or more shards to be distributed within a data center. The data center comprises a plurality of hosts divided into at least a first hierarchical level and a second hierarchical level. A usage score is calculated for a plurality of nodes in the first hierarchical level of the data center and the plurality of nodes in the first hierarchical level is sorted based on the calculated usage score. A set of replicas is distributed to one or more of the plurality of nodes within the first hierarchical level based on the sorting of the plurality of nodes.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein.

SUMMARY

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In various embodiments, a replica distribution scheme for one or more shards is received. The replica distribution scheme indicates a number of replicas of the one or more shards to be distributed within a data center. The data center comprises a plurality of hosts divided into at least a first hierarchical level and a second hierarchical level. A usage score is calculated for a plurality of nodes in the first hierarchical level of the data center and the plurality of nodes in the first hierarchical level is sorted based on the calculated usage score. A set of replicas is distributed to one or more of the plurality of nodes within the first hierarchical level based on the sorting of the plurality of nodes.

Figure 1:
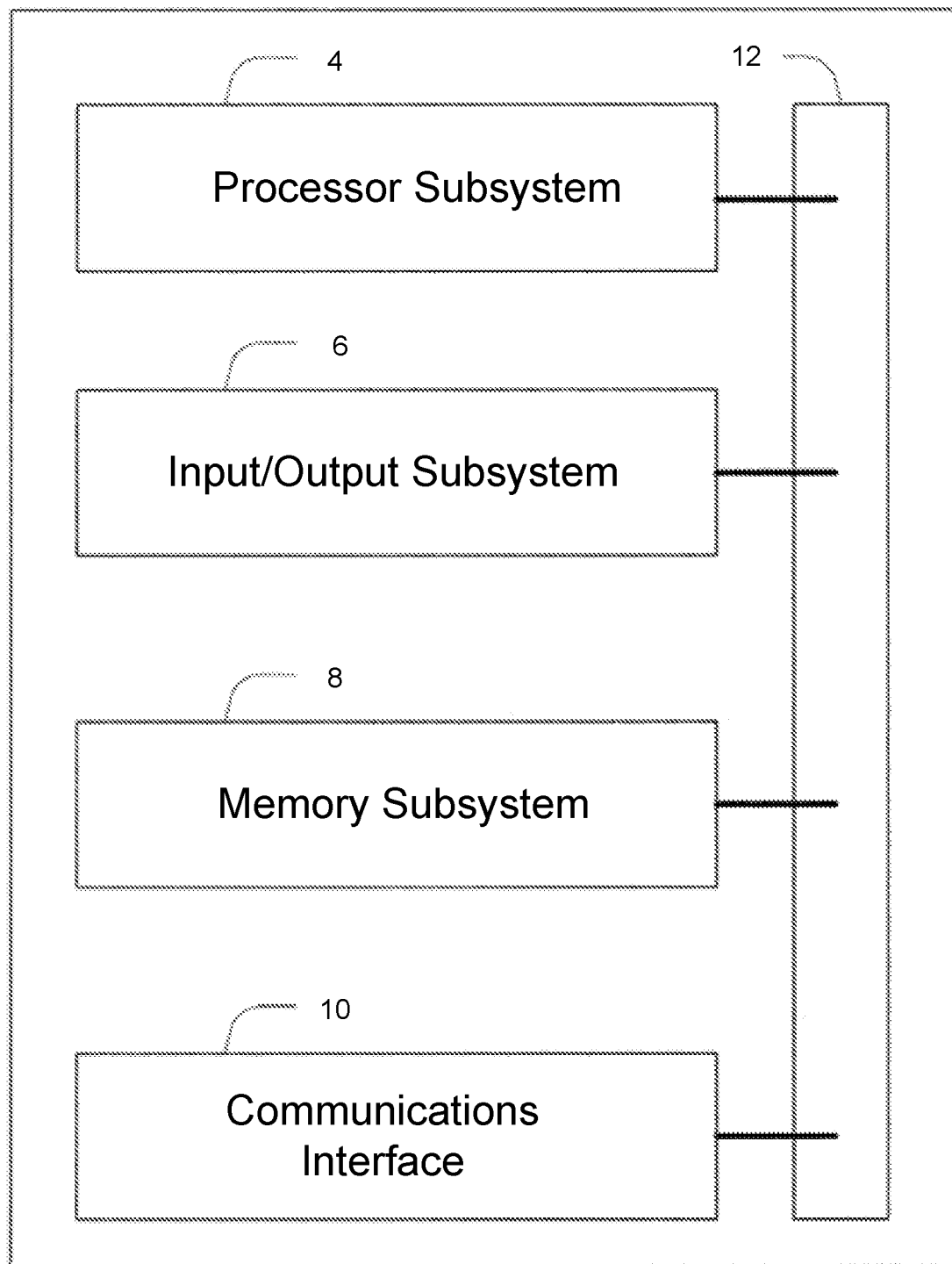
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including AB testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
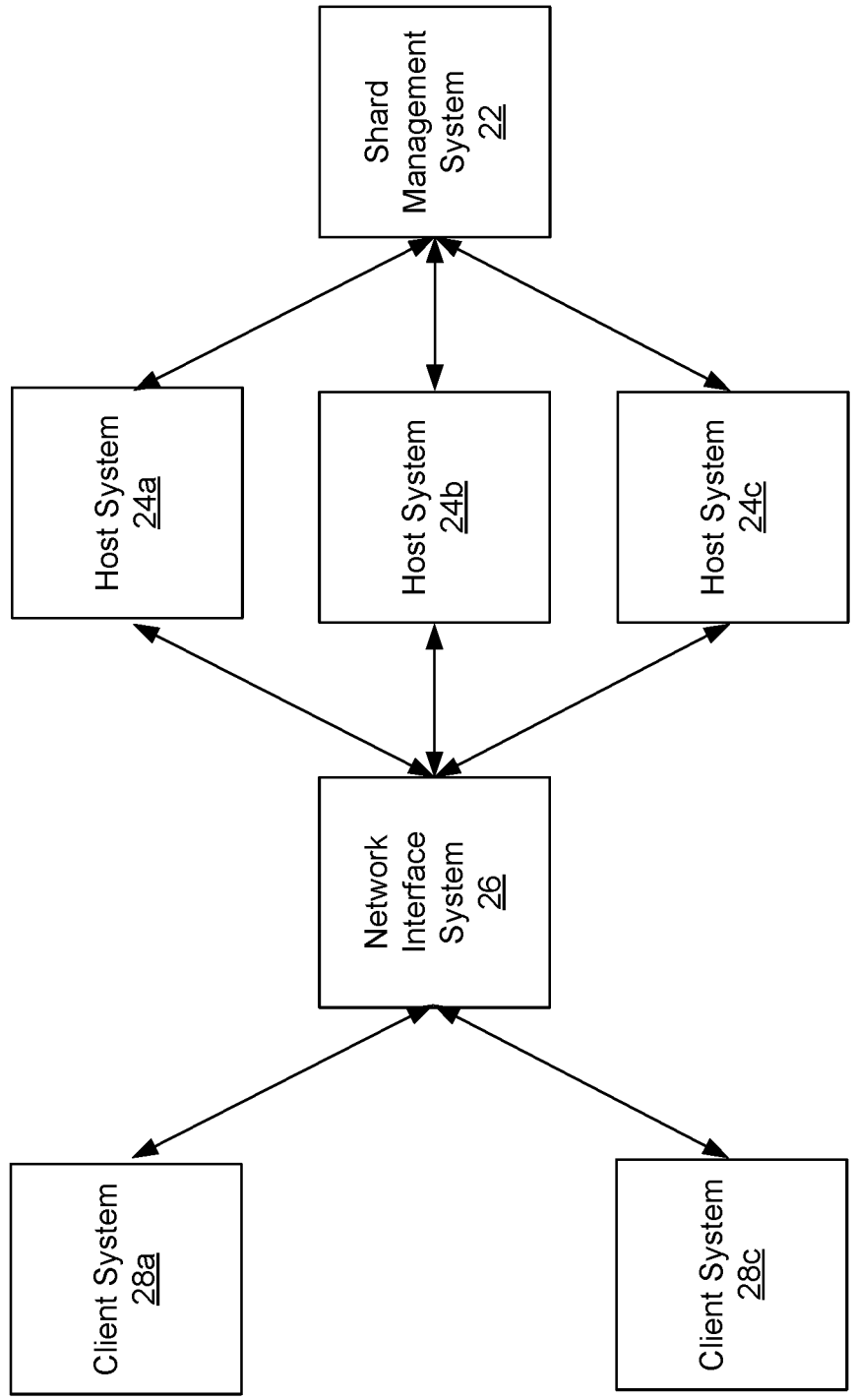
FIG. 2 illustrates a network configured to provide a distributed database including one or more shards distributed over a plurality of hosts, in accordance with some embodiments.

FIG. 2 illustrates a network 20 including a shard management system 22, a plurality of host systems (hosts) 24a-24c, a network interface system 26, and a plurality of client systems 28a-28b. Each of the systems 22-24c can include a system 2 as described above with respect to FIG. 1, and similar description is not repeated herein. Although the systems are each illustrated as independent systems, it will be appreciated that each of the systems may be combined, separated, and/or integrated into one or more additional systems. For example, in some embodiments, the one or more of the host systems 24a-24c can be combined into a single system.

Each of the host system 24a-24c are configured to maintain one or more replicas of a shard. Each shard includes a set of data (e.g., records, database entries, files, etc.). The shard can include a set of data associated with one or more categories. For example, in an e-commerce environment, each shard can relate to a category of products available within the e-commerce environment (e.g., sporting goods, groceries, home goods, etc.), a sub-category of products (e.g., hockey goods, baseball goods, football goods, etc.), and/or any other division of products within the e-commerce environment. Although specific embodiments are discussed herein, it will be appreciated that the each shard can include any set of data related to any category.

Each shard is implemented in a distributed cluster. Each distributed cluster includes two or more replicas of the shard (e.g., copies of the shard) instantiated on the host systems 24a-24c. For example, in some embodiments, each shard includes a predetermined number of replicas that are distributed onto a similar number of host systems 24a-24c. Each host system 24a-24c can be configured to implement a single replica and/or multiple replicas. In some embodiments, each of the host systems 24a-24c are in signal communication with a network interface system 26 that routes data requests from client system 28a-28b to one of the host systems 24a-24c including a replica of the shard related to the data request.

Figure 3:
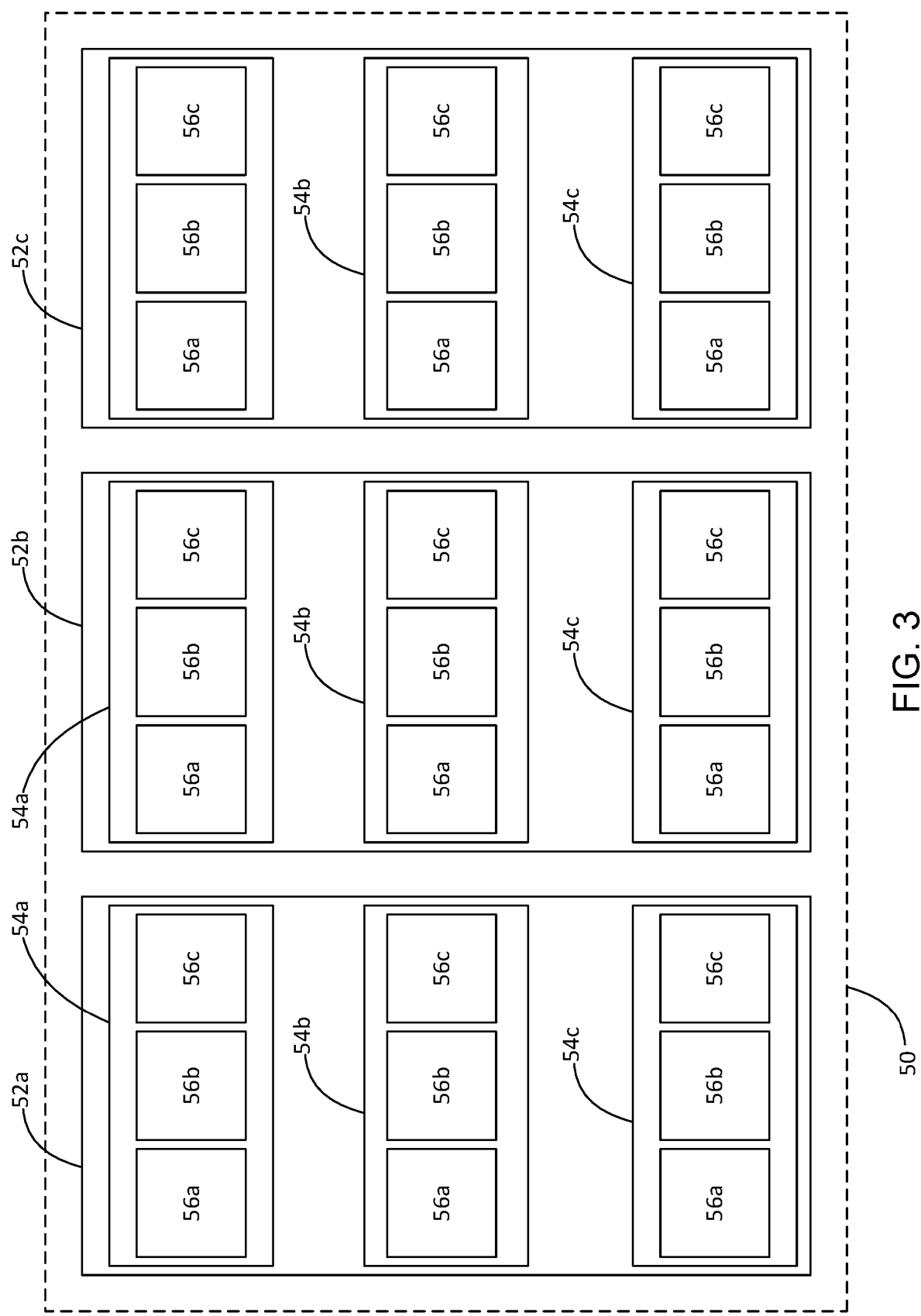
FIG. 3 illustrates a data center configured to provide high-availability of one or more shards, in accordance with some embodiments.

FIG. 3 illustrates a data center 50 configured to provide high-availability of one or more shards, in accordance with some embodiments. The data center includes a plurality of fault domains 52a-52c. Each of the plurality of fault domains 52a-52c includes utilities and other services that are independent. For example, in some embodiments, each of the fault domains include independent power connections, independent cooling systems, independent maintenance systems, independent back-up systems, etc. In some embodiments, independent fault-domains may include logical groupings of sets of utilities such that a first set of utilities may be offline without affecting one or more additional sets of utilities. Each fault domain 52a-52c is independently maintained such that a failure of a utility of one fault domain, such as failure of electricity to the first fault domain, does not affect operation of the remaining fault domains 52b, 52c.

Each of the fault domains 52a-52c includes a plurality of update domains 54a-54c. Similar to the fault domains 52a-52c, each update domain 54a-54c within a fault domain may include independent utilities and/or services coupled to the fault domain 52a-52c utilities and services and/or logical groupings of utilities within the fault domains 52a-52c. For example, a first fault domain 52a includes a plurality of update domains 54a-54c each having independent electrical, cooling, and other utility connections coupled to the electrical, cooling, and other utilities provided by the fault domain 52a-52c. The update domains 54a-54c are independently coupled to their respective fault domains 52a-52c such that any one of the update domains 54a-54c, such as a first update domain 54a, may be taken offline without affecting operation of the other update domains 54a-54c, such as a second and third update domain 54b, 54c. However, each of the update domains 54a-54c are connected to the parent fault domain 52a-52c such that failure or maintenance of the parent fault domain 52a-52c results in a corresponding outage of all of the associated update domains 54a-54c.

Each of the update domains 54a-54c includes a plurality of servers 56a-56c. The servers 56a-56c are independently coupled to their respective update domains 54a-54c such that any one of the servers 56a-56c, such as a first server 56a, may be taken offline without affecting operation of the other servers 56a-56c, such as a second and third server 56b, 56c. However, each of the servers 56a-56c are coupled to the common update domain 54a-54c such that failure of the shared update domain 54a-54c results in failure of all of the associated servers 56a-56c. In some embodiments, each of the servers 56a-56c may be independently susceptible to hardware failures such as disk crashes, network partitioning, etc. In some embodiments, and as discussed in greater detail below, the data center 50 is configured such that at least some replicas of a shard are hosted on separate servers 56a-56c.

Although the illustrated data center 50 includes three hierarchical levels, it will be appreciated that a data center 50 can be divided into any number of hierarchical levels, each having independent connections to one or more services or utilities provided by a shared higher-level hierarchical level. Each discussed hierarchical level may be further divided into additional sub-levels each having a shared connection to the prior sublevel, as described above. For example, in the illustrated embodiment, each hierarchical level may include a plurality of independent sub-domains that can be online and/or offline independent of other sibling domains within the hierarchical level. Similarly, multiple data centers 50 may be grouped into a single hierarchical level above the data center 50 level described herein. It will be appreciated that any number of hierarchical levels can be used and are within the scope of this disclosure.

In some embodiments, each of the servers 56a-56c includes one or more hosts 24a-24c configured to implement a replica of a shard in a distributed cluster. In a general embodiment, a data center 50 is configured to house one or more collections ($C_n$) of data. Each collection $C_n$ has a number of shards S(i), where i represents the current collection [DT1]. Each shard is maintained within the data center 50 by a number of replicas R(i) Further, the data center 50 is divided into a plurality of hierarchical layers $H_n$, with each layer being divided into sub-layers. For example, in the illustrated embodiment, $H_1$ is the plurality of fault domains 52a-52c, $H_2$ is the plurality of update domains 54a-54c within each fault domain 54a-54c, and $H_3$ is the plurality of servers 56a-56c within each update domain 54a-54c. Although the illustrated embodiment shows an equal distribution within each hierarchical level, it will be appreciated that each element (e.g., fault domain, update domain, server, etc.) within each hierarchical level has a variable number of nodes N. As used herein, the term "node" refers to the elements of a sub-level within a hierarchical level (e.g., the nodes of the fault domains 52a-52c are update domains 54a-54c, the nodes of the update domains 54a-54c are servers 56a-56c, etc.).

Figure 4:
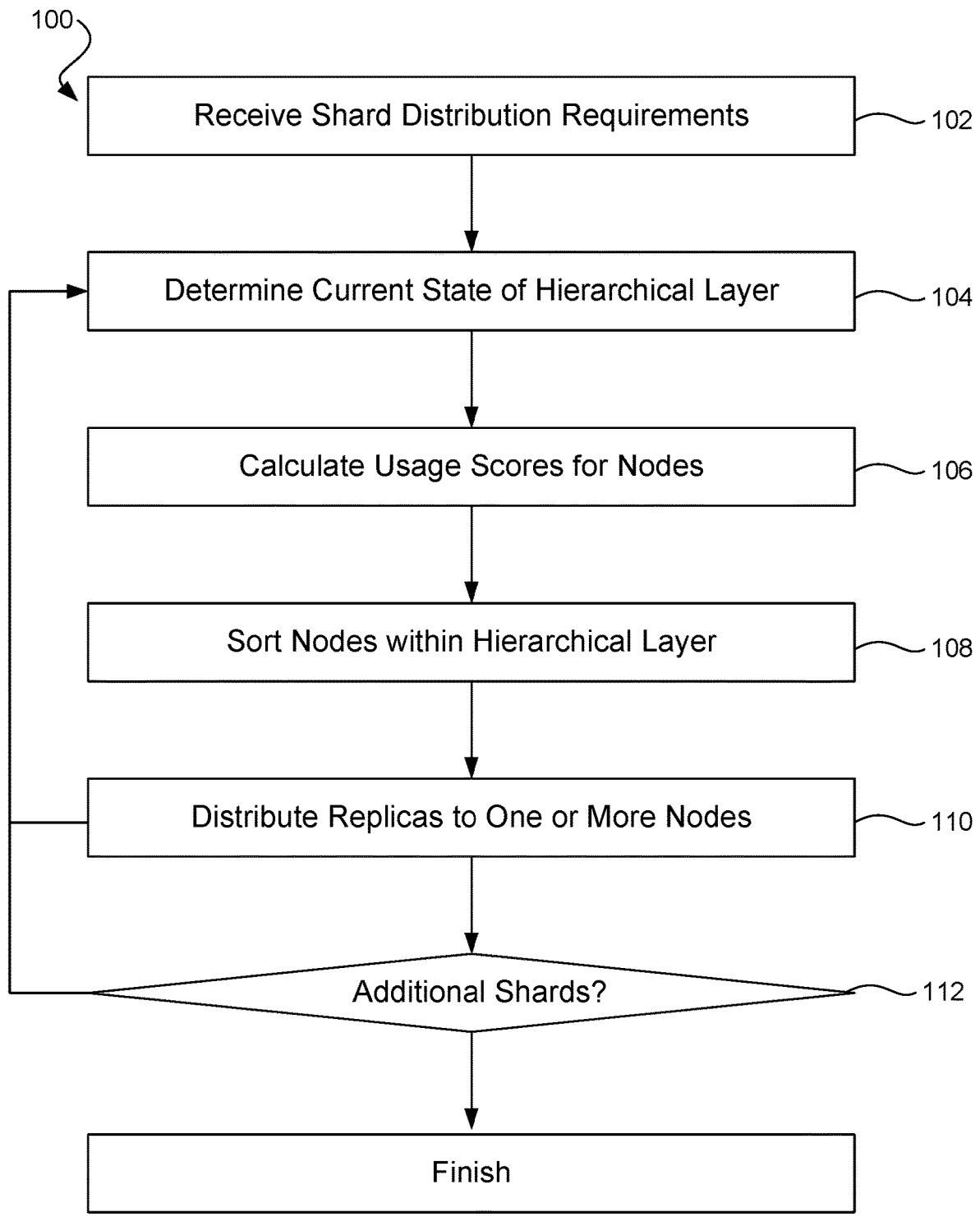
FIG. 4 is a flowchart illustrating a method of distributing a plurality of shards within a data center to provide high-availability, in accordance with some embodiments.

FIG. 4 is a flowchart illustrating a method 100 of distributing a plurality of shards within a data center to provide high-availability, in accordance with some embodiments. At step 102, a shard distribution requirement is received and the current state of a cluster of shards is reviewed to determine if the current distribution of replicas satisfies the shard distribution requirement. For example, as discussed in greater detail below with respect to FIGS. 7A-7C, in some embodiments, a shard distribution of 2 shards each having 5 replicas may be received. A system, such as a shard management system, may poll review the current distribution of replicas within a data center and/or one or more hierarchical layers of the data center to determine if the necessary numbers of replicas has been instantiated for each shard. If the current distribution of shards satisfies the shard distribution requirement, the method 100 terminates. If one or more additional replicas must be added to satisfy the shard distribution requirement, the method 100 proceeds to step 104.

At step 104, a state of a current hierarchical layer of a data center 50 is determined. For example, in some embodiments, a shard management system polls each hierarchical level of the data center 50 to determine one or more parameters regarding the current hierarchical level. In some embodiments, and with reference to the data center 50 illustrated in FIG. 3, a shard management system may determine the number of replicas within the current hierarchical layer (e.g., the number of replicas distributed in each fault domain 52a-52c, each update domain 54a-54c within each fault domain 52a-52c, and/or each server 56a-56c within each update domain 54a-54c), the number of sub-nodes within each node of the current hierarchical layer (e.g., the number of update domains 54a-54c within each fault domain 52a-52c, the number of servers 56a-56c within each update domain 54a-54c, the number of hosts within each server 56a-56c, etc.), the total number of hosts within each node, and/or any other suitable parameters. In some embodiments, the shard distribution requirement may be limited to a subset of available fault domains 52a-52c, update domains 54a-54c, and/or servers 56a-56c. In such instances, the parameters are determined only for the selected subset within the hierarchical layers.

At step 106, a usage score is calculated for each node within the current hierarchical level. For example, to continue the example from above, usage scores for a first hierarchical level of the data center 50 includes usage scores for each fault domain 52a-52c. For each fault domain 52a-52c, usage scores for each update domain 54a-54c within the respective fault domain 52a-52c are calculated. Similarly, for each update domain 54a-54c, usage scores for each server 56a-56c within the respective update domain 54a-54c are calculated.

In some embodiments, a usage score includes a plurality of values based on one or more of the parameters of the hierarchical layer nodes determined at step 104. For example, in some embodiments, a usage score includes a plurality of values representative of the number of replicas instantiated within the node, the number of hosts within the current hierarchical layer, and a density value (e.g., a ratio of replicas to hosts). In such an embodiment, an update domain with five replicas and three hosts may have a usage score of {replicas: 5; hosts: 3; density: 1.67}. Usage scores may be calculated for each node within the current hierarchical layer. For example, if the update domain includes three servers each having a single host, the usage scores for each server may, in one embodiment, include:

Server 1) {replicas: 1; hosts: 1; density: 1};
Server 2) {replicas: 2; hosts: 1; density: 2};
Server 3) {replicas: 2; hosts: 1; density: 2}

As another example, in some embodiments, a usage score includes the number of nodes within the next sub-layer of the hierarchical structure (e.g., the number of update domains within a fault domain, the number of servers within an update domain, the number of hosts within a server, etc.). For example, a fault domain with two update domains, five replicas, and three hosts may have a usage score of {nodes: 2; replicas: 5; hosts: 3; density: 1.67}. It will be appreciated that these usage scores are provided only as examples and that the each hierarchical layer may have any suitable usage score including any suitable values based on distribution of replicas, hosts, nodes, sub-layers, etc.

At step 108, the nodes within each hierarchical layer are sorted based on one or more predetermined sorting criteria. For example, in some embodiments, the nodes may be sorted by density in ascending order, e.g., the nodes having lower density are ranked lower (e.g., ranked before) than the nodes having a higher density. As another example, in some embodiments, the nodes may be sorted by the number of hosts within each node in descending order, e.g., the nodes having a higher number of hosts are ranked lower than the nodes having a lower number of hosts. As yet another example, in some embodiments, the nodes may be sorted by the number of sub-nodes within each node in descending order, e.g., the nodes having a higher number of sub-nodes in a first sub-layer are ranked lower than the nodes having a lower number of sub-nodes. In some embodiments, the nodes are sorted by multiple sorting criteria in a predetermined weighting. For example, in some embodiments, the nodes may be sorted first by density, then by the number of hosts within each node, and finally by the number of sub-nodes within each node.

In some embodiments, the size of the replicas within each node may be considered when sorting the nodes. For example, if a first node includes one replica including 100 GB of data and a second node includes two replicas each having 1 GB of data, the second node may be preferred (e.g., sorted lower) than the first node for placement of any replica below a predetermined sized, such as, for example, below 100 GB. In some embodiments, one or more nodes may be dedicated to a single large replica while other nodes within the same hierarchical layer are shared among multiple smaller replicas. Although specific sorting criteria and/or combinations of sorting criteria are discussed herein, it will be appreciated that any suitable sorting criteria and/or combination of sorting criteria can be used to sort the nodes within each hierarchical layer. In some embodiments, the same sorting criteria is applied for each hierarchical level within a data center 50, although it will be appreciated that different hierarchical layers can have different sorting criteria, different combinations of sorting criteria, and/or different weightings of sorting criteria.

At step 110, one or more replicas of a first shard are distributed to one or more nodes within the hierarchical level according to one or more predetermined distribution rules. In some embodiments, the one or more replicas are distributed such that, where possible, each node within a hierarchical level receives an equal number of replicas. For example, if six replicas are to be distributed amongst three fault domains, each fault domain will receive two of the six replicas. Similarly, if the two replicas received by a first fault domain are to be distributed amongst two update domains, each update domain will receive one replica.

When even distribution of replicas is not possible (i.e., adding a number of replicas not equal to a multiple of the number of nodes), the node(s) with a lower sorting based on step 108 are preferred. For example, if two replicas are to be distributed within a hierarchical layer including three or more nodes, the two nodes having the lowest sorting (e.g., the lowest density, highest number of hosts, highest number of nodes, etc.) are selected to receive the replicas. If a number of replicas greater than the number of nodes is to be distributed, the nodes are evenly distributed (to the extent possible) and the nodes having the lowest sorting each receive an additional node until all nodes are distributed.

In some embodiments, if the sorting at step 108 results in two or more nodes having an equal ranking (e.g., equal values for each of the sorting criteria), one or more additional rules may be applied. As one example, if the sorting at step 108 results in two nodes being ranked equally, the node having the fewest number of replicas for the current shard may be selected, e.g., if a first node includes 2 replicas of a first shard and a second node includes one replica of the first shard, assuming all other sorting values being equal, a replica of the first shard will be placed in the second node. In some embodiments, if two or more nodes are still equally ranked after applying additional rules, a node is selected randomly from the available nodes.

If the nodes selected at step 110 are hosts, e.g., the current hierarchical layer includes servers 56a-56c, distribution of the replicas includes instantiation of the selected number of replicas on the selected host(s). For example, if two replicas are being distributed to the node, the host instantiates two replicas of the shard. The method then proceeds to step 112. If the nodes selected at step 110 are not hosts, e.g. the current hierarchical layer includes nodes that have sub-nodes, the method 100 returns to step 104 and steps 104-110 are performed for the selected node.

At step 112, a check is performed to determine if replicas of a one or more additional shards need to be distributed. If replicas of at least one additional shard are to be distributed, the method 100 returns to step 104 and steps 104-112 are repeated for each additional shard. After all replicas of all shards are distributed according to the shard distribution requirements, the method 100 completes. Distribution of replicas according to method 100 provides a distribution across each hierarchical layer such that the data center 50 can tolerate the loss of a maximum number of nodes at each hierarchical layer while maintaining availability of each shard, e.g., best high-availability.

Figure 5:
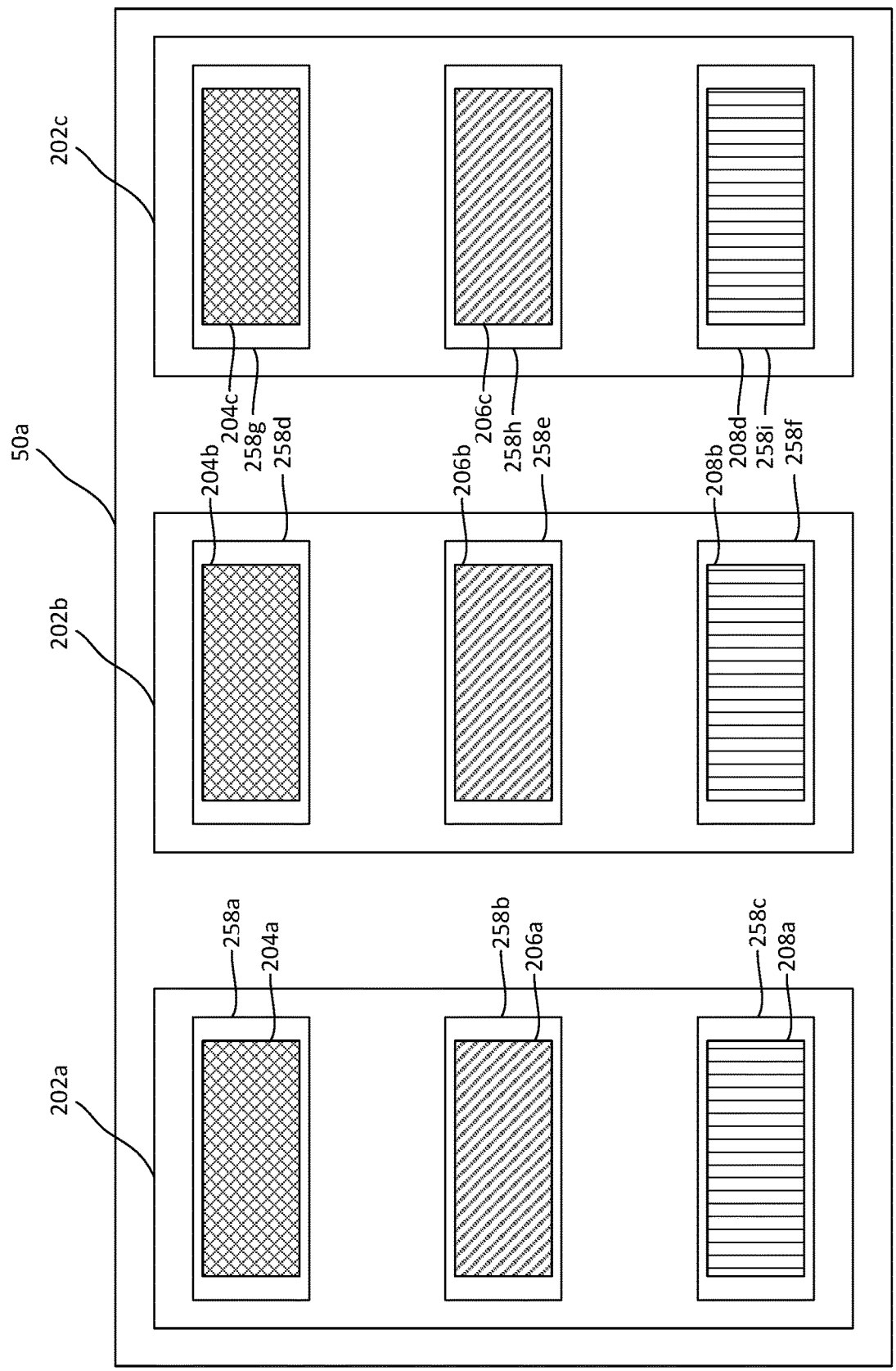
FIG. 5 illustrates a shard replica distribution scheme for three shards in a single tier data center, in accordance with some embodiments.

FIG. 5 illustrates a single-tier data center 50a having a plurality of replicas distributed according to a replica distribution scheme configured to provide high-availability for three shards, in accordance with some embodiments. The single-tier data center 50a includes three nodes 202a-202c within a top-level hierarchical layer (e.g., $H_1$). Each node 202a-202c includes three hosts 258a-258i (collectively hosts 258). Each of the hosts 258 is configured to instantiate at least one replica of at least one shard. In the illustrated embodiment, the replica distribution requirements dictate three replicas for each shard. In a traditional distribution scheme, the replicas are randomly assigned within the data center 50a such that the replicas for one shard can be clustered within one or two of the nodes 202a-202c. Failure of one or two nodes in a traditional distribution results in failure of at least one shard.

In contrast, FIG. 5 illustrates a replica distribution according to the method 100 configured to provide high-availability of each shard. As shown, the three replicas for each shard are evenly distributed among the nodes 202a-202c. For example, a first shard includes a first set of replicas 204a-204c. Each node 202a-202c includes one of the first set of replicas 204a-204c. Similarly, a second shard includes a second set of replicas 206a-206c with each node 202a-202c including one of the second set of replicas 206a-206c. A third set of replicas 208a-208c of a third shard are also evenly distributed over the three nodes 202a-202c. The replica distribution scheme of FIG. 5 provides high-availability, as failure of any one or any two nodes 202a-202c does not result in failure of any of the shards.

Figure 6:
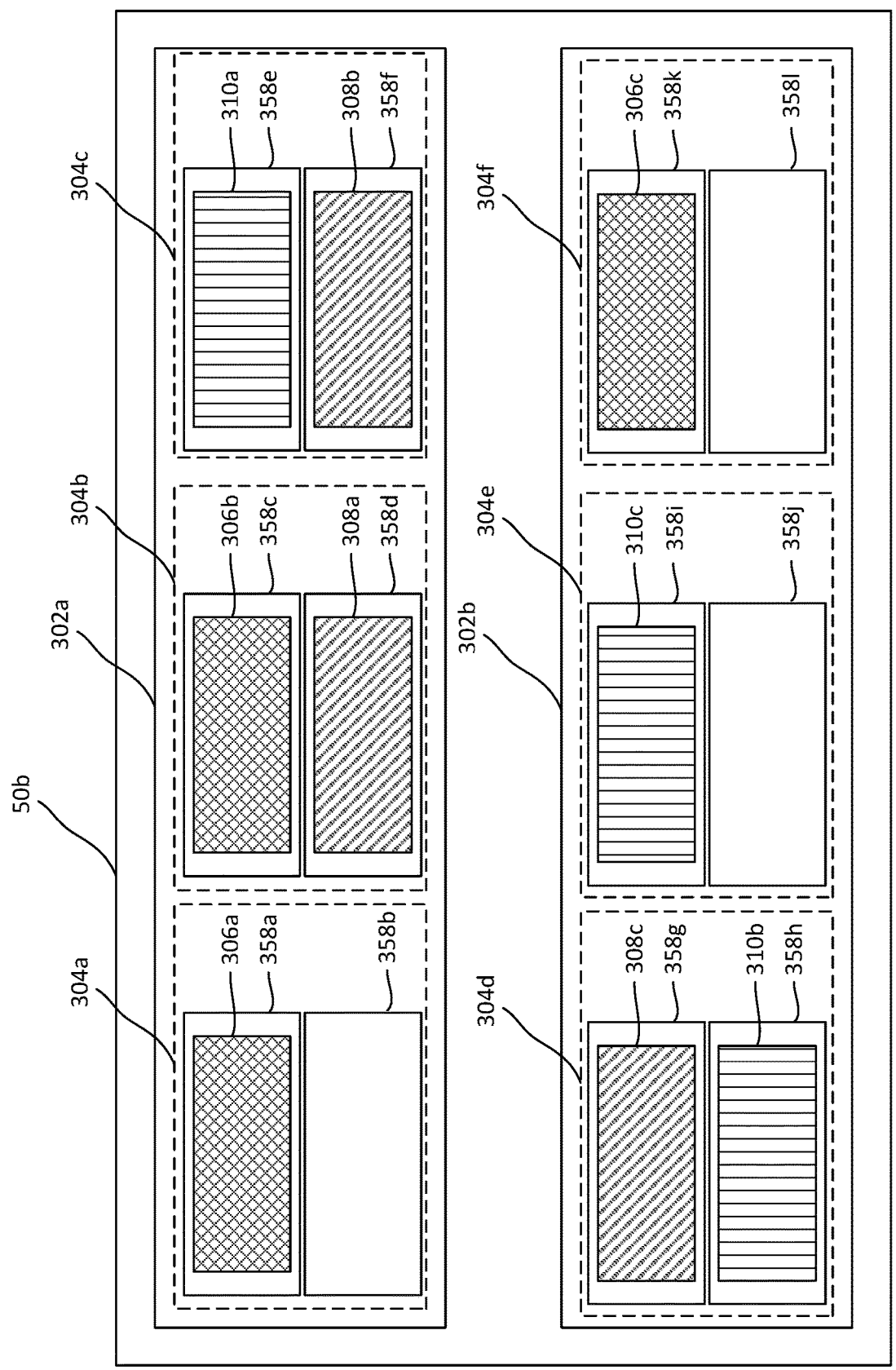
FIG. 6 illustrates a shard replica distribution scheme for three shards in a two-tier data center, in accordance with some embodiments.

FIG. 6 illustrates a two-tier data center 50b having a plurality of replicas distributed according to a replica distribution scheme configured to provide high-availability for three shards, in accordance with some embodiments. The two-tier data center 50b includes a top-level hierarchical layer ($H_1$) having two nodes 302a-302b (e.g., fault domains). Each top-level node 302a-302b includes three sub-nodes, e.g., the second hierarchical layer ($H_2$) of each node 302a-302b includes three nodes 304a-304f (e.g., update domains). Each second-level node 304a-304f includes two hosts 358a-358l (collectively hosts 358). Each of the hosts 358 is configured to instantiate at least one replica of at least one shard. In the illustrated embodiment, the replica distribution requirements dictate three replicas for each shard. In a traditional distribution scheme, the replicas are randomly assigned within the data center 50b such that the replicas for one shard can be clustered within one of the first nodes 302a-302b and/or within two of the second nodes 304a-304f. Failure of one of the first nodes 302a-302b or two of the second nodes 304a-304f in a traditional distribution may result in failure of at least one shard.

In contrast, FIG. 6 illustrates a replica distribution according to the method 100 configured to provide high-availability of each shard. As shown, the three replicas for each shard are evenly distributed among the first level nodes 302a-302b. For example, a first shard includes a first set of replicas 306a-306c. Two replicas 306a, 306b are located within node 302a (e.g., a first fault domain) and one replica 306c is located within node 302b (e.g., a second fault domain). Similarly, a second shard includes a second set of replicas 308a-308c. Two replicas 308a, 308b are located within node 302a (e.g., the first fault domain) and one replica 308c is located within node 302b (e.g., the second fault domain). A third set of replicas 208a-208c of a third shard are also evenly distributed within the first level nodes 302a, 302b with one replica 310a being located within node 302a and two replicas 310b, 310c located within the node 302b. The replica distribution scheme of FIG. 6 ensures at least one replica of each shard is available if either one of the first level nodes 302a, 302b is unavailable.

Similarly, the replicas are distributed within each first level node 302a, 302b to provide high-availability within the first level node 302a, 302b. For example, the node 302a includes two replicas 306a, 306b of a first shard, two replicas 308a, 308b of a second shard, and one replica 310a of a third shard. The two replicas 306a, 306b of the first shard maintained by the node 302a are located on separate sub-nodes 304a, 304b (e.g., within separate update domains). Similarly, the two replicas 308a, 308b of the second shard maintained by the node 302a are located on separate sub-nodes 304b, 304c. As another example, the node 302b includes two replicas 310b, 310c of the third shard, which are each maintained by separate sub-nodes 304d, 304e. Distribution of the replicas to different sub-nodes 304a-304c ensures availability of the shard within the top-level node 302a even when one of the sub-nodes 304a-304c is unavailable. As shown in FIG. 6, the unused hosts 58b, 58j, 58i are available for additional distribution of replicas for one or more shards.

Figure 7A:
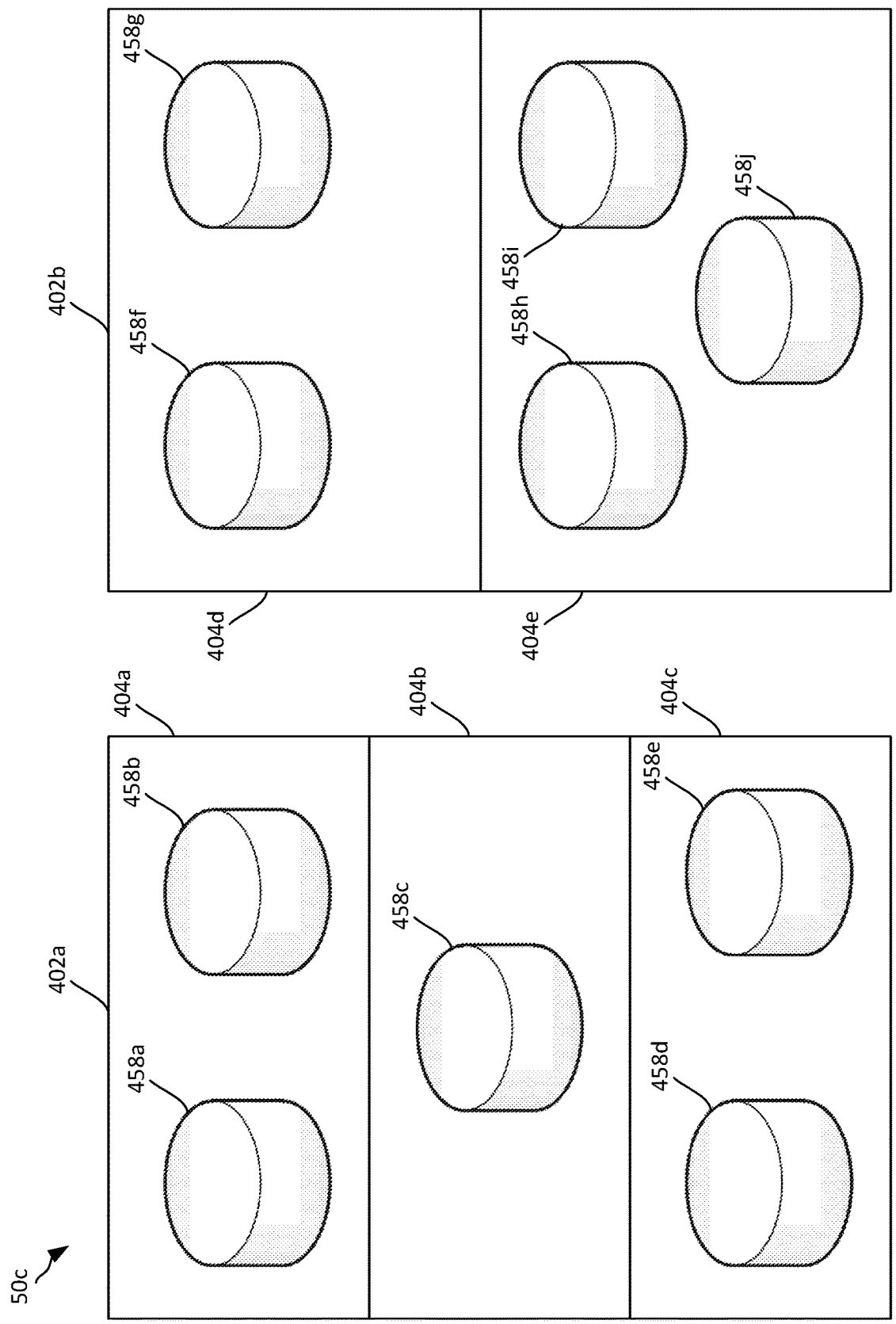
FIGS. 7A-7C illustrates a data center shard distribution during one embodiments of the method of FIG. 4, in accordance with some embodiments.
Figure 7B:
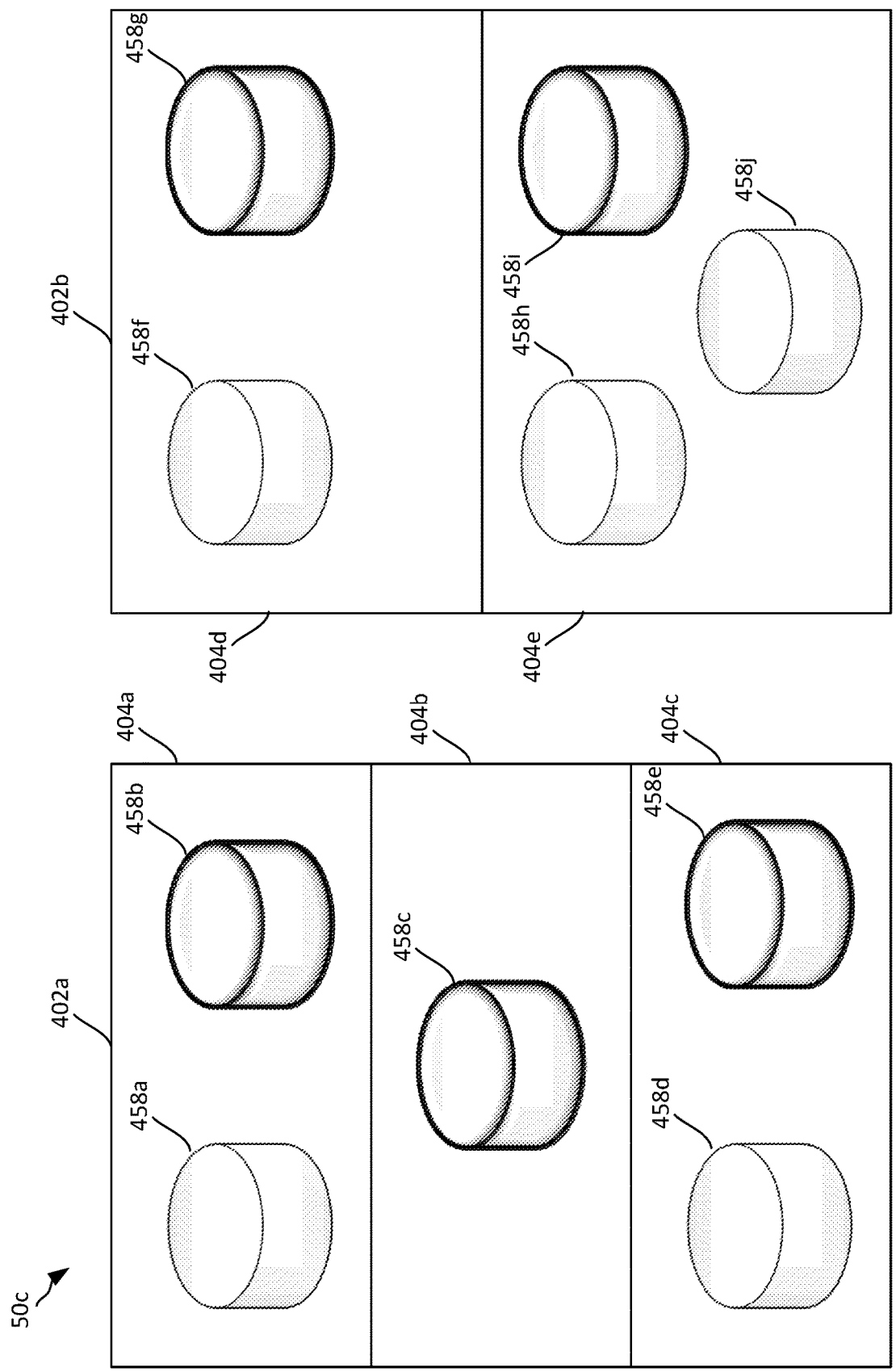
Figure 7C:
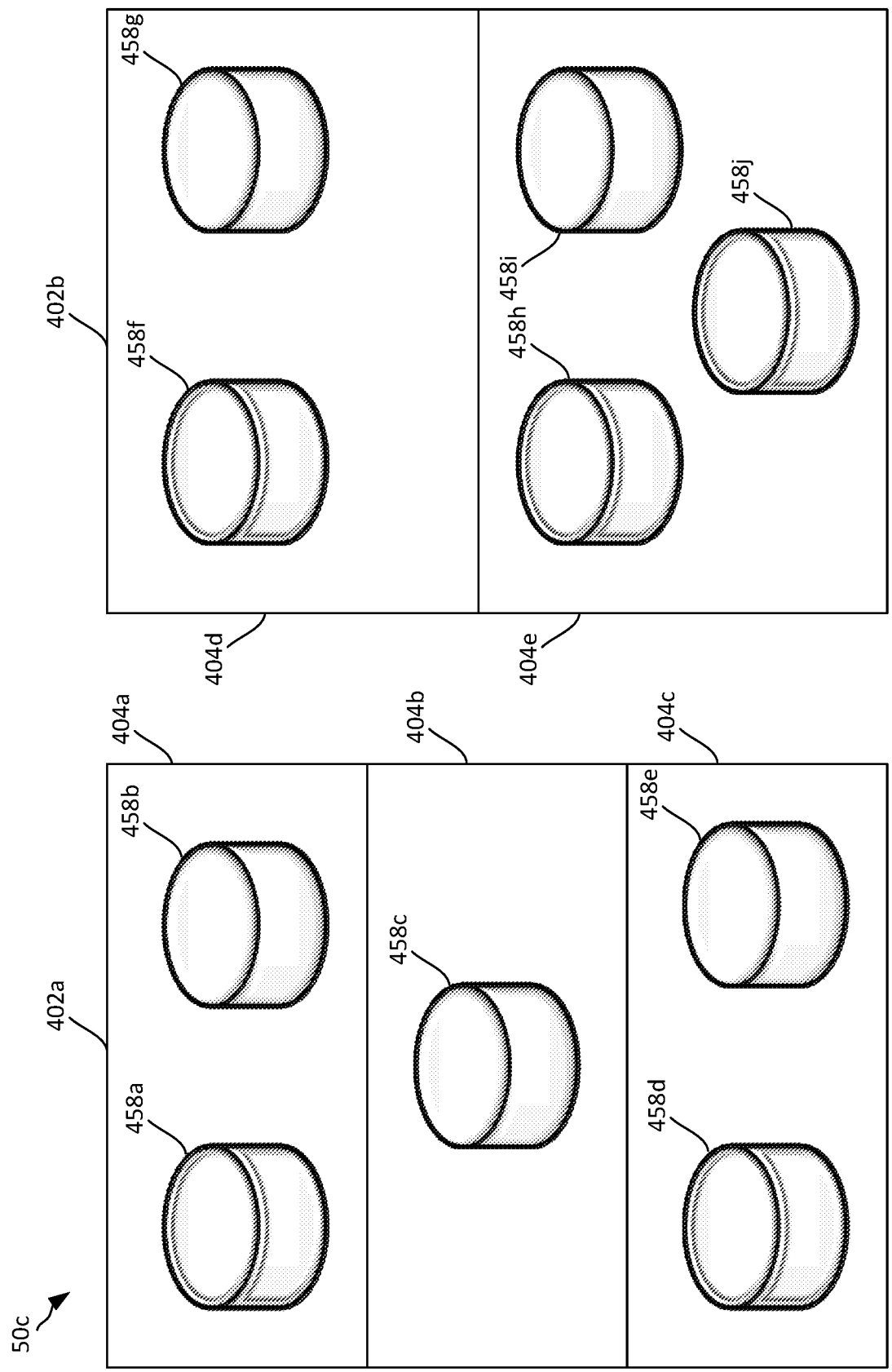

FIGS. 7A-7C illustrates a replica distribution within a data center 50c for two shards according to the method 100, in accordance with some embodiments. With reference to FIGS. 4 and 7A-7C, implantation of a replica distribution scheme is discussed. FIG. 7A illustrates the data center 50c in an initial state with no replicas distributed. The data center 50c includes two fault domains 402a, 402b in a first hierarchical level ($H_1$). The first fault domain 402a includes three update domains 404a-404c in a second hierarchical level ($H_2$) and the second node 402b includes two update domains 404d, 404e in the second hierarchical level ($H_2$). Each of the update domains 404a-404e includes one, two, or three hosts 458a-458j.

At an initial time $t_0$, a shard management system receives a replica distribution scheme indicating that two shards should each have five replicas distributed within the data center 50c. The shard management system reviews the initial replica distribution shown in FIG. 7A and determines that no replicas are distributed within the data center 50c. The shard management system selects one of the two shards, such as a first shard, for distribution within the data center 50c.

The shard management system then polls the fault domains 402a, 402b within the first hierarchical level $H_1$ to determine the number of sub-nodes, hosts, and replicas in each fault domains 402a, 402b. The shard management system calculates usage scores for each fault domains 402a, 402b in the first hierarchical level $H_1$. The usage scores includes the number of sub-nodes in each fault domain 402a, 402b, the number of hosts in each fault domain 402a, 402b, the number of replicas in each fault domain 402a, 402b, and the density of each fault domain 402a, 402b. The density is calculated by dividing the number of replicas by the number of hosts within the fault domain 402a, 402b. The calculated usage scores for the first fault domain 402a ($FD_1$) and the second fault domain 402b ($FD_2$) are:

$FD_1$: {sub-nodes: 3; hosts: 5; replicas: 0; density: 0};
$FD_2$: {sub-nodes 2; hosts: 5; replicas: 0; density: 0}.

After calculating the usage scores, the shard management system sorts the fault domains 402a, 402b within the first hierarchical layer $H_1$ using a predetermined sorting scheme including an initial sort by density in ascending order, a sort within each density by number of hosts in descending order, and a sort within each number of hosts by number of sub-nodes in descending order. Each of the fault domains 402a, 402b include the same density (0) and the same number of hosts (5). However, $FD_1$ 402a has three sub-nodes and $FD_2$ 402b has two sub-nodes, resulting in $FD_1$ 402a being ranked lower.

After sorting the fault domains 402a, 402b the shard management system assigns replicas of the first shard to each of the nodes. In the illustrated embodiment, the replica distribution scheme requires five shards to be distributed. The shard management system first distributes the replicas of the first shard evenly amongst the fault domains 402a, 402b. The shard management system assigns two replicas to each fault domain 402a, 402b, leaving one replica to be distributed based on additional distribution rules. The shard management system reviews the fault domain rankings and determines that $FD_1$ 402a is ranked lower than $FD_2$ 402b (due to $FD_1$ 402a having three sub-nodes). Because $FD_1$ 402a is ranked lower, the shard management system distributes the extra replica to $FD_1$ 402a such that the final distribution includes three replicas in $FD_1$ 402a and two replicas in $FD_2$ 402b.

After determining the replica distribution for the first hierarchical level $H_1$, the shard management system repeats the distribution process within each fault domain 402a, 402b. For example, three replicas are assigned to $FD_1$ 402a. The shard management system polls each update domain 404a-404c within $FD_1$ 402a to determine the number of sub-nodes, hosts, and replicas in each update domain 404a-404c. The shard management system calculates usage scores for each update domain 404a-404c in the second hierarchical level $H_2$. The calculated usage scores for a first update domain 404a ($UD_1$), a second update domain ($UD_2$), and a third update domain ($UD_3$) include:

$UD_1$: {hosts: 2; replicas: 0; density: 0};
$UD_2$: {hosts: 1; replicas: 0; density: 0}; and
$UD_3$: {hosts: 2; replicas: 0; density: 0}.

After calculating the usage scores, the shard management system sorts the update domains 404a-404c within $FD_1$ 402a using a predetermined sorting scheme similar to the sorting scheme used for the first hierarchical level $H_1$. Specifically, the update domains 404a-404c are first sorted by density and then sorted by the number of hosts within each update domain 404a-404c. Because the update domains 404a-404c contain only hosts (and do not contain further hierarchical divisions such as servers), the update domains 404a-404c are not sorted by number of sub-nodes (as this would be the same sort as number of hosts). After sorting, $UD_1$ and $UD_3$ have an equal ranking that is lower than $UD_2$.

After sorting the update domains 404a-404c, the shard management system assigns the three replicas of the first shard within $FD_1$ 402a. The shard management system initially distributes the replicas equally among the update domains 404a-404c. Because there are three update domains 404a-404c within $FD_1$ 402a and three replicas to be distributed, the replicas can be evenly distributed and the ranking of the update domains 404a-404c is not considered.

Similarly, two replicas are assigned to $FD_2$. The shard management system polls each update domain 404d-404e within $FD_2$ 402b to determine the number of sub-nodes, hosts, and replicas in each update domain 404d-404e. The shard management system calculates usage scores for each update domain 404d-404e in the second hierarchical level $H_2$. The calculated usage scores for a fourth update domain 404d ($UD_4$) and a fifth update domain ($UD_5$) include:

$UD_4$: {hosts: 2; replicas: 0; density: 0}; and
$UD_5$: {hosts: 3; replicas: 0; density: 0}.

After calculating the usage scores, the shard management system sorts the update domains 404d-404e within $FD_2$ 402b using the same predetermined sorting scheme as used for the update domains 404a-404c of $FD_1$ 402a. After sorting, $UD_5$ is ranked lower than $UD_4$, as $UD_5$ has more hosts.

After sorting the update domains 404d-404e, the shard management system assigns the two replicas of the first shard within $FD_2$ 402b. The shard management system initially distributes the replicas equally among the update domains 404a-404c. Because there are two update domains 404d, 404e within $FD_2$ 402b and two replicas to be distributed, the replicas can be evenly distributed without considering the ranking of the update domains 404d, 404e.

The distribution process is repeated for each update domain 404a-404e within each fault domain 402a, 402b. Because no replicas have been distributed, the shard management system randomly selects one host within each update domain to instantiate the assigned replica. FIG. 7B illustrates the data center 50c after the replicas of the first shard have been distributed. Five hosts 458b, 458c, 458e, 458g, 458i include a replica of a first shard. The hosts 458b, 458c, 458e, 458g, 458i are shown with bold lines to illustrate a replica of the first shard.

After distributing the replicas for the first shard, the shard management system generates and distributes replicas of the second shard, as required by the replica distribution requirements. The shard management system polls the fault domains 402a, 402b within the first hierarchical level $H_1$ and calculates a new usage scores for each fault domains 402a, 402b. The new usage score takes the prior replica distribution into account. The calculated usage scores for the $FD_1$ 402a and $FD_2$ 402b are:

$FD_1$: {sub-nodes: 3; hosts: 5; replicas: 3; density: 0.6};
$FD_2$: {sub-nodes 2; hosts: 5; replicas: 2; density: 0.4}.

After calculating the usage scores, the shard management system sorts the fault domains 402a, 402b using the predetermined sorting scheme. $FD_1$ 402a has a density of 0.6 and $FD_2$ has a density of 0.4, causing $FD_2$ 402b to be ranked lower than $FD_1$ 402a. Based on the sorting and distribution rules, the shard management system distributes the three replicas to $FD_2$ 402b and two replicas to $FD_1$ 402a (as $FD_2$ is now ranked lower and therefore receives the extra replica).

After determining the replica distribution for the first hierarchical level $H_1$, the shard management system repeats the distribution process within each fault domain 402a, 402b. For example, three replicas are assigned to $FD_2$ 402b. The shard management system polls each update domain 404d-404e within $FD_2$ 402b and calculates usage scores for each update domain 404d-404e in the second hierarchical level $H_2$. The calculated usage scores include:

$UD_4$: {hosts: 2; replicas: 1; density: 0.5}; and
$UD_5$: {hosts: 3; replicas: 1; density: 0.334}.

After calculating the usage scores, the shard management system sorts the update domains 404*d*-404*e* using the predetermined sorting scheme for hierarchical level $H_2$. After sorting, $UD_5$ is ranked lower than $UD_4$ (as $UD_5$ has a lower density). After sorting the update domains 404*d*-404*e*, the shard management system assigns the three replicas of the second shard within $FD_2$ 402*b*. Based on the sorting and distribution rules, the shard management system assigns two replicas to $UD_5$ and one replica to $UD_4$.

Similarly, two replicas are assigned to $FD_1$ 402*a*. The shard management system polls each update domain 404*a*-404*c* within $FD_1$ 402*a* and calculates usage scores for each update domain 404*a*-404*c* in the second hierarchical level $H_2$. The calculated usage scores include:
$UD_1$: {hosts: 2; replicas: 1; density: 0.5};
$UD_2$: {hosts: 1; replicas: 1; density: 1}; and
$UD_3$: {hosts: 2; replicas: 1; density: 0.5}.
After calculating the usage scores, the shard management system sorts the update domains 404*a*-404*c* within $FD_1$ 402*a* using the predetermined sorting scheme for hierarchical level $H_2$. After sorting, $UD_1$ and $UD_3$ are ranked equally, and both are ranked lower than $UD_2$, as $UD_2$ has a higher density than both $UD_1$ and $UD_3$.

After sorting the update domains 404*a*-404*c*, the shard management system assigns the two replicas of the second shard within $FD_1$ 402*a*. Based on the sorting and distribution rules, the shard management system assigns one replica to $UD_1$ and one replica to $UD_3$.

The distribution process is repeated for each update domain 404*a*-404*e* within each fault domain 402*a*, 402*b*. The distribution process within each update domain 404*a*-404*e* results in the replicas being assigned to unused hosts 458*a*, 458*d*, 458*f*, 458*h*, and 458*j*. FIG. 7C illustrates the data center 50*c* after distribution of the replicas of the second shard. The hosts 458*a*, 458*d*, 458*f*, 458*h*, 458*j* are shown with two bold lines to illustrate a replica of the second shard.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
a computing device configured to:
receive a replica distribution scheme for one or more shards, wherein the replica distribution scheme indicates a number of replicas of the one or more shards related to one or more collections to be distributed within a data center, wherein the data center comprises a plurality of hosts divided into at least a first hierarchical level and a second hierarchical level;
calculate a plurality of usage scores for a plurality of nodes in the first hierarchical level of the data center such that each of the plurality of nodes has a different calculated usage score, wherein each of the plurality of usage scores includes a plurality of values including a first value representative of a number of current replicas within the corresponding node, a second value representative of a number of hosts within the corresponding node and a third value representative of a density value;
sort the plurality of nodes in the first hierarchical level based on the calculated usage scores; and
distribute a set of replicas to one or more of the plurality of nodes within the first hierarchical level based on the sorting of the plurality of nodes.

2. The system of claim 1, wherein the computing device is configured to poll the plurality of nodes in the first hierarchical level to determine one or more parameters of each of the plurality of nodes.

3. The system of claim 2, wherein the one or more parameters includes the number of hosts within the corresponding node and the number of current replicas within the corresponding node.

4. The system of claim 1, wherein the density value is calculated by dividing the second value by the first value.

5. The system of claim 4, wherein the usage score further includes a number of sub-nodes within the corresponding node.

6. The system of claim 5, wherein the plurality of nodes are sorted first by the density value, second by the number of hosts within the corresponding node, and third by the number of sub-nodes within the corresponding node.

7. The system of claim 1, wherein the computing device is configured to:
calculate a sub-usage score for a plurality of sub-nodes in one of the plurality of nodes, wherein each of the plurality of sub-nodes includes a subset of the plurality of hosts within the one of the plurality of nodes;
sort the plurality of sub-nodes based on the calculated sub-usage scores; and
distribute a subset of replicas to one or more sub-nodes in the plurality of sub-nodes based on the sorting of the plurality of sub-nodes, wherein the subset of replicas includes each replica distributed to the one of the plurality of nodes.

8. The system of claim 7, wherein the plurality of nodes and the plurality of sub-nodes are sorted using different sorting criteria.

9. The system of claim 1, wherein the set of replicas are distributed by:
distributing an equal number of replicas to each of the one or more of the plurality of nodes; and
distributing a remainder of replicas to the one or more of the plurality of nodes based on a sorted order of the plurality of nodes, wherein the remainder of replicas are distributed from a lowest-ranked node to higher ranked nodes until all of the remainder replicas are distributed.

10. The system of claim 1, wherein the first hierarchy is selected from the group consisting of: fault domains, update domains, and servers, and wherein the second hierarchy is selected from the group consisting of: update domains, servers, and hosts.

11. A non-transitory computer readable medium having instructions stored thereon, wherein the instructions, when executed by a processor cause a device to perform operations comprising:
receiving a replica distribution scheme for one or more shards, wherein the replica distribution scheme indicates a number of replicas of the one or more shards related to one or more collections to be distributed within a data center, wherein the data center comprises a plurality of hosts divided into at least a first hierarchical level and a second hierarchical level;

calculating a plurality of usage scores for a plurality of nodes in the first hierarchical level of the data center such that each of the plurality of nodes has a different calculated usage score, wherein each of the plurality of usage scores includes a plurality of values including a first value representative of a number of current replicas within the corresponding node, a second value representative of a number of hosts within the corresponding node and a third value representative of a density value;

sorting the plurality of nodes in the first hierarchical level based on the calculated usage scores; and distributing a set of replicas to one or more of the plurality of nodes within the first hierarchical level based on the sorting of the plurality of nodes.

12. The non-transitory computer readable medium of claim 11, wherein the instructions, when executed by the processor, cause the device to perform further operations comprising polling the plurality of nodes in the first hierarchical level to determine one or more parameters of each of the plurality of nodes.

13. The non-transitory computer readable medium claim 12, wherein the one or more parameters includes the number of hosts within the corresponding node and the number of current replicas within the corresponding node.

14. The non-transitory computer readable medium of claim 11, wherein the density value is calculated by dividing the second value by the first value, and the usage score further includes a fourth value representative of a number of sub-nodes in each node.

15. The non-transitory computer readable medium of claim 14, wherein the plurality of nodes are sorted first by the density value, second by the number of hosts within the corresponding node, and third by the number of sub-nodes within the corresponding node.

16. The non-transitory computer readable medium of claim 11, wherein the instructions, when executed by the processor, cause the device to perform further operations comprising:

calculating a sub-usage score for a plurality of sub-nodes in one of the plurality of nodes, wherein each of the plurality of sub-nodes includes a subset of the plurality of hosts within the one of the plurality of nodes;

sorting the plurality of sub-nodes based on the calculated sub-usage scores; and distributing a subset of replicas to one or more sub-nodes in the plurality of sub-nodes based on the sorting of the plurality of sub-nodes, wherein the subset of replicas includes each replica distributed to the one of the plurality of nodes.

17. The non-transitory computer readable medium of claim 16, wherein the plurality of nodes and the plurality of sub-nodes are sorted using different sorting criteria.

18. The non-transitory computer readable medium of claim 11, wherein the set of replicas are distributed by:

distributing an equal number of replicas to each of the one or more of the plurality of nodes; and distributing a remainder of replicas to the one or more of the plurality of nodes based on a sorted order of the plurality of nodes, wherein the remainder of replicas are distributed from a lowest-ranked node to higher ranked nodes until all of the remainder of replicas are distributed.

19. A method, comprising:

receiving a replica distribution scheme for one or more shards, wherein the replica distribution scheme indicates a number of replicas of the one or more shards to be distributed within a data center, wherein the data center comprises a plurality of hosts divided into at least a first hierarchical level and a second hierarchical level;

polling the plurality of nodes in the first hierarchical level to determine one or more parameters of each of the plurality of nodes calculating a plurality of usage scores for a plurality of nodes in the first hierarchical level of the data center such that each of the plurality of nodes has a different calculated usage score, wherein each of the plurality of usage scores includes a plurality of values including a first value representative of a number of current replicas within the corresponding node, a second value representative of a number of hosts within the corresponding node and a third value representative of a density value;

sorting the plurality of nodes in the first hierarchical level based on the calculated usage scores; and distributing a set of replicas to one or more of the plurality of nodes within the first hierarchical level based on the sorting of the plurality of nodes.

20. The method of claim 19, comprising:

calculating a sub-usage score for a plurality of sub-nodes in one of the plurality of nodes, wherein each of the plurality of sub-nodes includes a subset of the plurality of hosts within the one of the plurality of nodes;

sorting the plurality of sub-nodes based on the calculated sub-usage scores; and distributing a subset of replicas to one or more sub-nodes in the plurality of sub-nodes based on the sorting of the plurality of sub-nodes, wherein the subset of replicas includes each replica distributed to the one of the plurality of nodes.

* * * * *